Feb. 16, 1960    J. BABISKIN ET AL    2,924,976
TEMPERATURE MEASURING DEVICE AND THERMOCOUPLE
Filed April 13, 1956
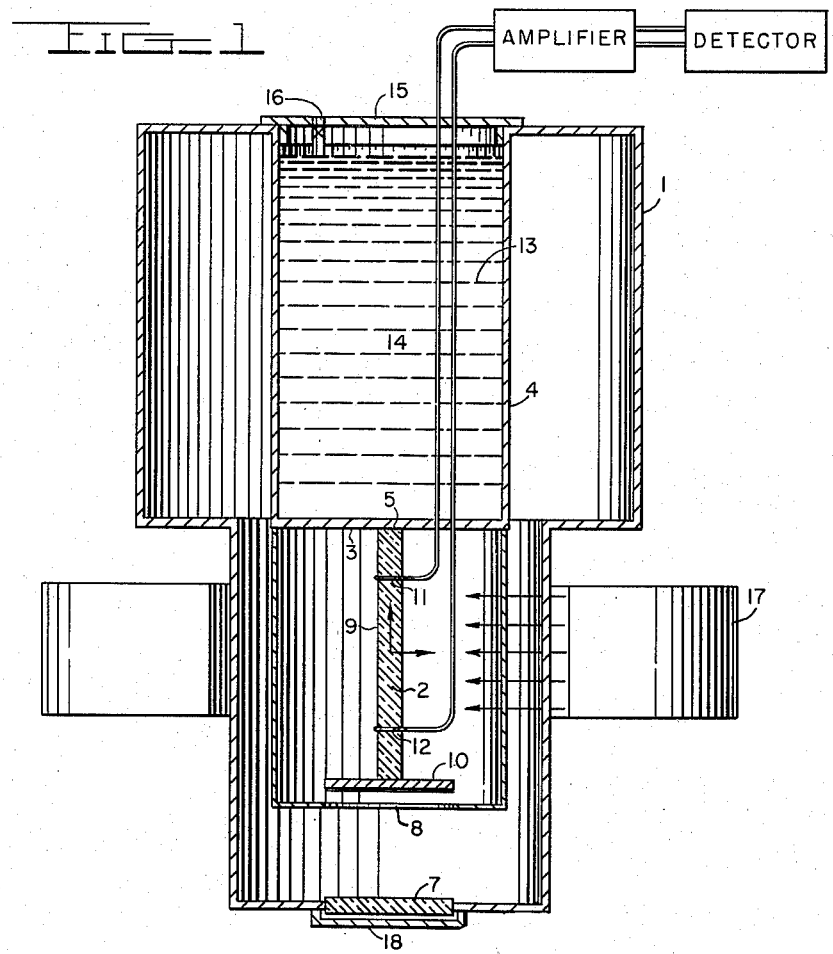
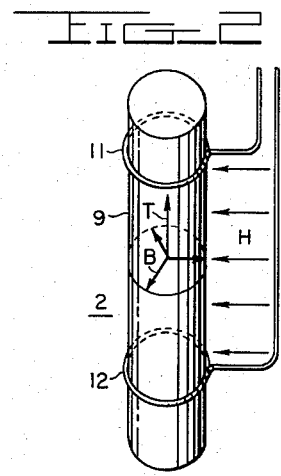
INVENTORS
JULIUS BABISKIN
MARTIN C. STEELE
BY *W.R. Maltby*
*Richard C. Reed* ATTORNEYS

United States Patent Office 2,924,976
Patented Feb. 16, 1960

2,924,976

TEMPERATURE MEASURING DEVICE AND THERMOCOUPLE

Julius Babiskin, Washington, D.C., and Martin C. Steele, Roosevelt, N.J., assignors to the United States of America as represented by the Secretary of the Navy Application April 13, 1956, Serial No. 578,155

4 Claims. (Cl. 73—359)

(Granted under Title 35, U.S. Code (1952), sec. 266)

The invention described herein may be manufactured and used by or for the Government of the United States of America for governmental purposes without the payment of any royalties therein or therefor.

The present invention relates to a temperature measuring device and thermocouple for detecting small temperature changes.

Bismuth heretofore used as the thermoelectric element in thermocouples is not pure metal but an alloy which is not sufficiently sensitive even when coupled with a D.C. amplifier and a suitable detector to register a temperature change of a magnitude below $1\times10^{-4}$° C.

It is an object of the present invention to provide a temperature measuring device having a thermocouple which when coupled with a D.C. amplifier and a suitable detector is capable of detecting temperature changes of a very much smaller order of magnitude than the above.

It is a further object to provide an improved bismuth type thermocouple which has high sensitivity to heat change, quick response and a relatively high microvolt output per degree change in temperature.

Other objects of the inventon will become apparent from the following description taken in conjunction with the accompanying drawing wherein like numerals indicate like parts and in which:

Fig. 1 is a view in section of a temperature measuring device of the invention in which is arranged a thermocouple in accordance with the invention.

Fig. 2 is a detail view of a heat sensitive element of the thermocouple in accordance with the invention.

Broadly stated, the new temperature measuring device of the invention comprises a heat-insulated chamber in which is located the new thermocouple and which is provided with means for admitting heat to the thermocouple and with means for holding a refrigerant for deep cooling of the junctions of the thermocouple. The new temperature measuring device also includes means for directing a magnetic field perpendicularly across the thermocouple in operation of the device.

The new thermocouple of the invention is a bismuth-copper thermocouple which is characterized by the fact that the bismuth, which is the thermoelectric element, is a single crystal of pure bismuth (99.99% pure). Bismuth has a rhombohedral crystal structure with trigonal symmetry and has one trigonal axis and three binary axes. It is the use of the bismuth single crystal coupled with the magnetic field to which it is subjected and the deep cooling of the junctions of the thermocouple which enables measurement of heat changes of a very small order, less than $1\times10^{-4}$° C., by means of the new temperature measuring device. By orienting the bismuth crystal and the magnetic field such that the lines of flux cut across the crystal parallel to one of the three binary axes and perpendicular to its trigonal axis, measurement of heat changes as small as $1\times10^{-6}$° C. can be made by means of the new temperature measuring device when the junctions of the thermocouple are cooled to a temperature of 4.2° K.

Referring to Fig. 1 of the drawing, the heat insulated chamber 1 is suitably an evacuated double walled metal vessel of the well-known Dewar construction which has been modified to retain the new thermocouple 2 in position therein and to admit heat radiation to the latter. The thermocouple is mounted in upright spaced relation in the chamber by depending from a metal plate 3 which is fixed to the inner walls 4 of the chamber. Any suitable means can be used for firmly attaching the thermocouple to the plate 3, suitably by fusing the upper terminal 5 of the bismuth crystal to the plate. The bottom section of the outer wall 6 of the chamber is provided with an opening in which is mounted a window 7 of a material which will transmit infra-red radiation, for example, quartz, the window being of a section thick enough to withstand the vacuum between the walls of the chamber. In alignment with window 7 is an opening 8 in the bottom portion of the inner wall 4 for admission of the heat radiation to the collector of the thermocouple.

The thermoelectric element 9 of the thermocouple is a single crystal of bismuth (99.99% pure) in which the trigonal axis is parallel to the crystal length. The element 9 has its lower terminal fused to a copper heat collecting plate 10 which is blackened on its under side to assist absorption of the incident heat. Copper junctions 11 and 12 (No. 44 wire) are fused to the element 9 and lead through a cooling section 13 of the chamber to an amplifier and detector which may be of a suitable design. The leads from the copper junctions 11 and 12 pass through and are electrically insulated from the metal plate 3 by the use of glass to metal seals.

The cooling section or compartment 13 of the chamber is defined by the plate 3 and inner walls 4 and is provided with a refrigerant 14 with liquid helium as the refrigerant. Liquid helium is capable of providing temperatures of 4.2° K and lower for operation of the new temperature measuring device, lower temperatures being attained by reduced pressures over the liquid helium. A metal cover plate 15 of suitable thickness is provided for preventing influx of air into compartment 13, the cover being provided with a vent 16 having a one-way valve for exit of vaporized refrigerant. Addition of liquid refrigerant can be made through the vent 16. Standard low temperature techniques can be used for reducing the evaporation of the liquid helium, for example, a jacket of liquid nitrogen.

A magnet 17 which may be a permanent magnet, as shown, or an electromagnet is arranged around the lower portion of the chamber 1 in position to direct a magnetic field across the thermocouple in the chamber. As previously mentioned, the arrangement of the magnet is preferably such as to direct the magnetic flux parallel to a binary axis of the bismuth crystal 9 and perpendicular to the trigonal axis thereof. The magnet is supported in any suitable manner (not shown). The magnet should be capable of producing a field of at least 3000 gauss with best results being obtainable at the higher values, for example, 12,000 gauss.

The location and relation of the binary axes and the trigonal axis of the bismuth crystal 9 are shown in the enlarged view of the thermocouple of Figure 2, the binary axes being indicated by the letter B and the trigonal axis by the letter T. As can be seen from the drawing, the trigonal axis is perpendicular to the binary axes and parallel to the crystal length. The magnetic flux is indicated by H.

In the operation of the new temperature measuring device, the junctions 11 and 12 of the thermocouple 2 are maintained at a constant low temperature by means of the liquid helium in the compartment 13 of the chamber 1. The compartment 13 can be made of sufficient volume to hold a body of liquid helium of a magnitude which will maintain a temperature of 4.2° K. at the junction 11 for a suitable period of time, for example, twelve hours. The device is electrically coupled to the detector and where necessary or desired to the amplifier, also, and the cover 18 on the window 7 removed to allow heat coming from the medium, the change in temperature of which is to be determined, to enter the device where, through absorption by the collector 10, it is transmitted to the bismuth crystal 9. The heat transmitted to the crystal 9 causes a potential to be set up between the copper junctions 11 and 12 which is recorded by the detector to give the degree of temperature change. As mentioned above, the potential induced in the crystal may first be fed into an amplifier before recording, as would be necessary where extremely small changes in temperature are to be determined.

The voltage induced in the bismuth crystal 9 is of small magnitude for small temperature changes.

The voltage induced in the crystal 9 between the copper junctions 11 and 12 is enhanced by the effect of directing a magnetic field across the crystal, especially when the lines of flux are parallel to a binary axis of the crystal and, by circumstance, perpendicular to the trigonal axis of the crystal. The magnetic field increases the thermoelectric power of the crystal, the latter being proportional to the strength of the magnetic field. At liquid helium temperatures, the magnetic field has a much more pronounced effect in increasing the thermoelectric power of the crystal. The sensitivity of the thermocouple of the new temperature measuring device to degree of temperature changes materially increased by the factors of cooling of the crystal and subjecting it to the effect of a magnetic field directed across the same. With a temperature of 4.2° K. at the upper junction 11 of the thermocouple and subjecting the crystal 9 to a magnetic field of 12,000 gauss directed parallel to binary axis of the crystal, a thermoelectric power of 10,000 microvolts per degree centigrade change in temperature can be induced between the copper injunctions which when fed into an amplifier capable of detecting .01 microvolt enables the detection of temperature changes as low as $1 \times 10^{-6}$° C.

The bismuth crystal 9 at a temperature of 4.2 K. has a negligible specific heat and therefore small changes of heat input give a relatively large change in temperature which thus increases the sensitivity of the device to heat radiation.

In the table below are set forth the thermoelectric power of various known thermocouples as reported in the literature and for the new bismuth-copper thermocouple of the invention. The power values for the known thermocouples were for room temperature operation. The power value for the new thermocouple is for operation at 4.2° K. (liquid helium as coolant) and in a magnetic field of 12,000 gauss directed parallel to one of the binary axis of the bismuth crystal. The thermoelectric power of the thermocouple is in each instance given in microvolts per degree change in temperature on the centigrade scale.

Table

| Thermocouple | Temperature | Thermoelectric Power in Microvolts/ deg. C. |
|---|---|---|
| Iron—Constantan | Room | 53 |
| Copper—Constantan | do | 40 |
| Chromel—Alomel | do | 40 |
| Bismuth—Copper | do | 100 |
| Do | 4.2° K | 5 |
| Bismuth—Copper (new) | 4.2° K (magnetic field) | 10,000 |

Analysis of the results in the above table clearly shows the greater sensitivity of the new bismuth-copper thermocouple.

Since various changes and modifications may be made in the practice of the invention without departing from the spirit or scope thereof, it is intended that the foregoing description including the drawing shall be taken primarily by way of illustration and not in limitation of the invention except as may be required by the appended claims.

What is claimed is:

1. A temperature responsive device comprising in combination a heat insulated chamber having a compartment for liquid refrigerant, a bismuth-copper thermocouple having the bismuth present as an elongated single crystal of pure bismuth (99.99% pure) and the copper is present as lead lines connected at opposite ends of said bismuth, said thermocouple lying below said refrigerant compartment with the upper terminal of the bismuth crystal attached to the under side of the same and the copper wires leading through said refrigerant compartment, a magnet capable of projecting a magnetic field of at least 3000 gauss across the bismuth crystal, said thermocouple being positioned within said magnetic field with the longitudinal axis thereof perpendicular to said field and means for admitting heat to said thermocouple.

2. A temperature responsive device as defined in claim 1, wherein the heat insulated chamber is a double wall evacuated vessel.

3. A temperature responsive device comprising in combination a bismuth-copper thermocouple in which the bismuth is present as an elongated single crystal of bismuth (99.99% pure) and the copper is present as lead lines connected at opposite ends of said bismuth, a magnet positioned about said thermocouple capable of producing a magnetic field across said thermocouple, said thermocouple being positioned in said magnetic field with the magnetic lines of force directed perpendicular to the longitudinal axis of said elongated crystal of bismuth, means adapted to maintain said thermocouple at a constant temperature, and means connected to one end of said thermocouple for collecting and transferring incident heat to said thermocouple.

4. A temperature responsive device comprising in combination a heat insulated chamber having a compartment for liquid refrigerant, a bismuth-copper thermocouple in which the bismuth is present as an elongated single crystal of pure bismuth (99.99% pure) having a trigonal axis parallel to the crystal length and the copper is present as lead lines connected at opposite ends of said bismuth, said thermocouple lying below said refrigerant compartment with the trigonal axis perpendicular to said refrigerant compartment with an end of said bismuth crystal secured to the underside of the compartment with the copper wires leading through said refrigerant compartment, a magnet producing a magnetic field of at least 3000 gauss across the bismuth crystal said magnetic field being directed across said bismuth crystal with the lines of force perpendicular to the trigonal axis, and means for admitting heat to said thermocouple.

References Cited in the file of this patent
UNITED STATES PATENTS
2,189,122    Andrews _____ Feb. 6, 1940

OTHER REFERENCES

An article entitled, "The Design and Construction of Thermoelectric Cells," by R. V. Jones, pages 247–257 (250 and 251 only needed) of vol. II of Journal of Scientific Instruments, August 1934.

Appendix page 1311 of "Temperature, Its Measurement and Control," in Science and Industry, by American Institute of Physics, 1941 Reinhold Publishing Corp. 330 West 42nd Street, New York. (A copy is in Div. 36 of the U.S. Patent Office.)

Roess and Dacus: "Design and Construction of Rapid-Response Thermocouples for Use as Radiation Detectors in Infra-Red Spectrographs," Review of Scientific Instruments, vol. 16, No. 9, July 1945, p. 164–72 at page 166.

An article entitled, "The Design of Fast Thermopiles and the Ultimate Sensitivity of Thermal Detectors" by D. F. Hornig and R. J. O'Keefe, pages 474–482 (page 478 only needed) of vol. 18, No. 7, of Review of Scientific Instruments, July 1947.